United States Patent Office 2,814,931
Patented Dec. 3, 1957

2,814,931

GAS-TURBINE POWER PLANT INSTALLATIONS WITH MEANS FOR DISPOSAL OF DRAINAGE FUEL

Christopher Linley Johnson, Allestree, England, assignor to Rolls-Royce Limited, Derby, England, a British company Application February 9, 1954, Serial No. 409,203

Claims priority, application Great Britain February 13, 1953

17 Claims. (Cl. 60—35.6)

This invention relates to gas-turbine power plant installations and is concerned with fuel drain arrangements for such installations.

According to the present invention, a fuel drain arrangement of an open cycle gas-turbine power plant installation comprises a sump for collection of drainage fuel, and an ejector pump arrangement having a venturi passage whereof the inlet is connected to a source of pressure air in an engine of the installation and having a suction pipe connection leading from the sump to open into the venturi whereby fuel in the sump is entrained in the air flowing through the venturi passage, said ejector pump being arranged to deliver the fuel into the working fluid of an engine of the installation downstream of the turbine, thereby to carry the fuel clear of the installation.

According to a preferred arrangement of this invention, the air is derived from the engine compressor or from the air casing of combustion equipment of the engine to which air is delivered by a compressor, which combustion equipment is of the kind having an air casing within which is located a flame tube or flame tubes wherein combustion occurs, the air casing affording an air passage around the flame tube or tubes, and the ejected fuel is delivered into an exhaust assembly of an engine of the power plant installation, for instance into the jet pipe of the engine in the case of vehicles propelled by jet reaction. Alternatively the fuel may be delivered into the jet stream after it is exhausted through the final nozzle.

According to another preferred feature of this invention, the ejector pump arrangement comprises a plurality of venturi passages, each with an associated suction pipe. In one arrangement, the suction pipes draw fuel from separate fuel collector tanks at different locations in the power plant installation and in a second arrangement the suction pipes draw fuel from opposite ends of the same fuel collector tank. A common air supply may be made to the venturi passages and the venturi passages may be formed as a unit in a single body.

Some embodiments of this invention will now be described by way of example, the description referring to the accompanying drawings in which.

Each embodiment comprises a gas-turbine jet propulsion engine such as may be installed in a wing of an aircraft and comprises means for dealing with drainage fuel from various parts of the engine.

In each case the engine (Figure 1) comprises a compressor 20 which delivers compressed air into combustion equipment 21 wherein fuel is burned, and coaxially therewith a turbine 22 which receives combustion gases from the combustion equipment 21 and of which the rotor 22b is arranged to drive the rotor of the compressor 20 through a drive shaft 23 extending through the centre of the combustion equipment 21. Each embodiment also comprises an exhaust assembly comprising an outer wall 24 connected with the outer shroud 22a of the engine turbine and an inner conical wall 25 coaxial with the outer wall 24 and forming therewith an annular passage which at the apex of the conical wall merges into a full-circular-section exhaust duct. The downstream end of the outer wall 24 has secured to it the inlet end of a jet pipe 26 which at its downstream end carries a propelling nozzle 27 illustrated as a variable-area nozzle.

Figure 1:
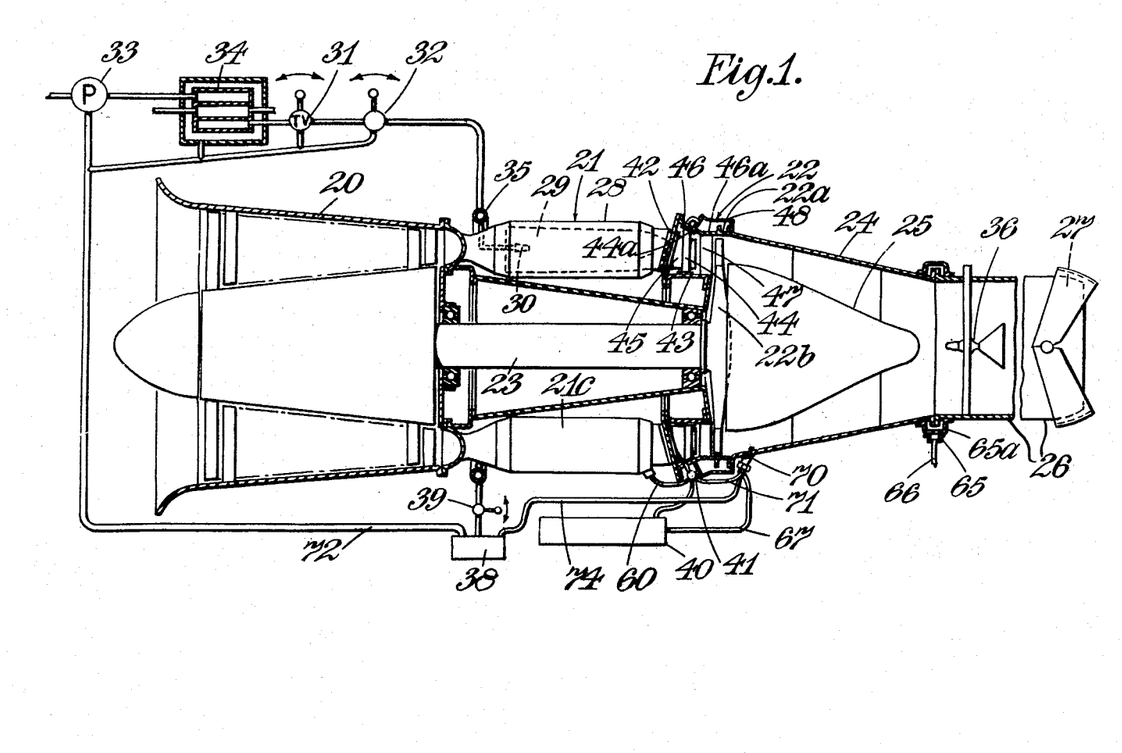
Figure 1 is a diagrammatic illustration of a gas-turbine engine power plant having drainage fuel disposal means associated therewith.

The combustion equipment 21 is of any convenient kind and is shown as comprising a number of individual combustion chambers each having an air casing 28 and coaxially within the air casing a flame tube 29 the wall of which is spaced from the wall of the air casing so as to leave an air passage around the flame tube; the combustion chambers are disposed in a ring about the driving shaft 23 connecting the turbine and compressor. Alternatively, as will be well understood, the combustion equipment 21 may be of the kind known as annular combustion equipment which has an air casing provided by a pair of annular coaxial radially-spaced walls and within the annular space between these walls either a series of flame tubes disposed with their axes substantially parallel to the axis of the annular walls, or an annular flame tube formed by inner and outer annular walls arranged coaxially with the annular walls of the air casing and in spaced relation thereto so as to leave annular air passages between the flame tube walls and the air casing walls.

In each case the fuel to be burned with the air delivered by the compressor is delivered into the flame tube 29. The fuel system associated with the burners 30 through which fuel is fed into the combustion equipment comprises a number of elements such as a throttle valve 31, a shut-off cock 32, and a fuel pump 33, and may also comprise devices such as oil coolers 34 through which the fuel is fed as a coolant. Moreover, the fuel system will usually include a manifold 35 from which the individual fuel burners 30 are supplied with fuel.

All these elements 31 through 35 may be liable under certain conditions of operation to be drained of fuel or to have fuel leak therefrom into a drain system. Fuel may also accumulate within the air casing or air casings 28 of the combustion equipment 21 and in the turbine assembly 22, 22a, and also, where reheat combustion equipment 36 is provided in the jet pipe 26, fuel may accumulate in the jet pipe 26 or in a casing 37 surrounding it. It is usual to provide means to drain off this fuel so as to prevent burning in the air casing, turbine or jet pipe with consequent overheating, and hitherto this drainage fuel has merely been led overboard. This may create a risk of fire due to the fuel adhering to the outside surface of the aircraft and being drawn in at a region of low pressure. Also it is undesirable for drainage fuel to be deposited on an airfield or on the deck of an aircraft carrier.

This invention provides means whereby drainage fuel can be disposed of during operation of the engine, whereby the fire risk and the deposition of fuel referred to are avoided.

In one arrangement (Figures 1 and 2), the power plant installation has associated with the engine a first drainage fuel collector tank 38 located below the engine adjacent the outlet end of the engine compressor and receiving fuel from such elements of the installation as a manifold dump valve 39 which is opened to drain the manifold when the main shut-off cock 32 of the fuel system is closed, from the throttle valve 31 and shut-off cock 32, and also if desired from the gland drain of the fuel pump 33 and from the drain of an oil cooler 34 which employs fuel as a coolant.

Figures 2, 8:
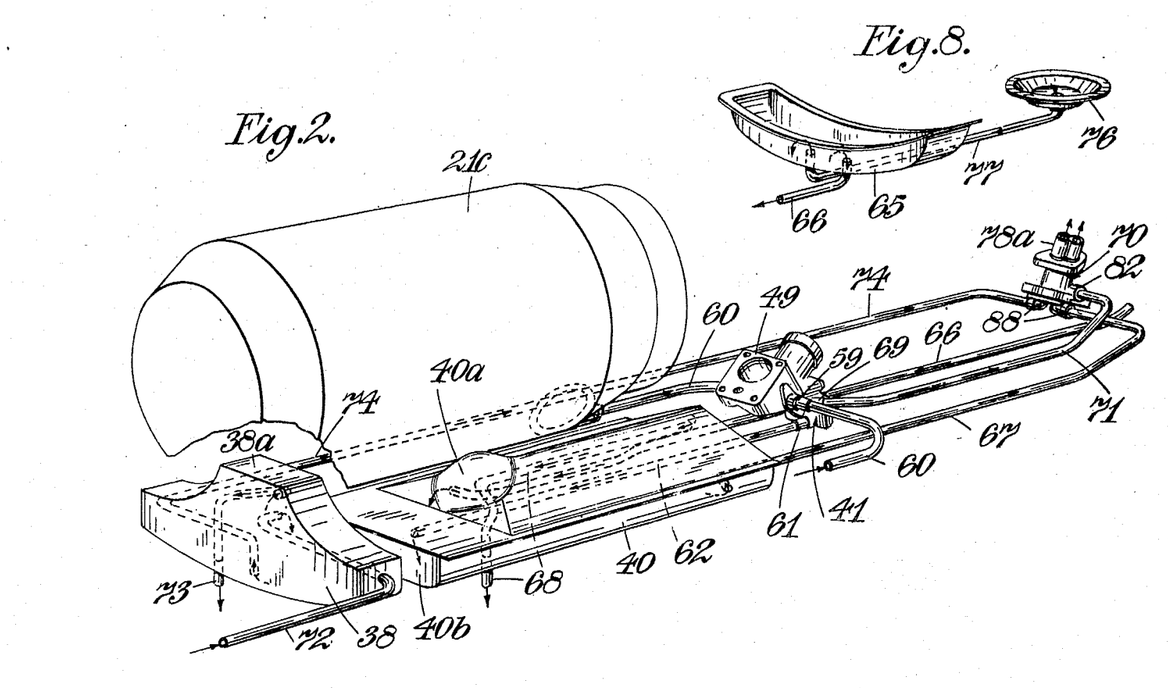
Figure 2 is a view in more detail of one form of drainage fuel disposal means of the power plant of Figure 1.
Figure 8 illustrates additional parts which may be employed with the arrangement of Figure 2.

The tank 38 has a drain fuel inlet pipe 72 leading from the elements from which fuel is to be drained to below a peaked portion 38a of the tank, a vent pipe 73 which has a number of bends in it and leads from the top of the peaked portion through the bottom of the tank, and an outlet connection 74 leading from the central bottom part of the tank 38 to a venturi pump unit 70.

Figures 4, 5:
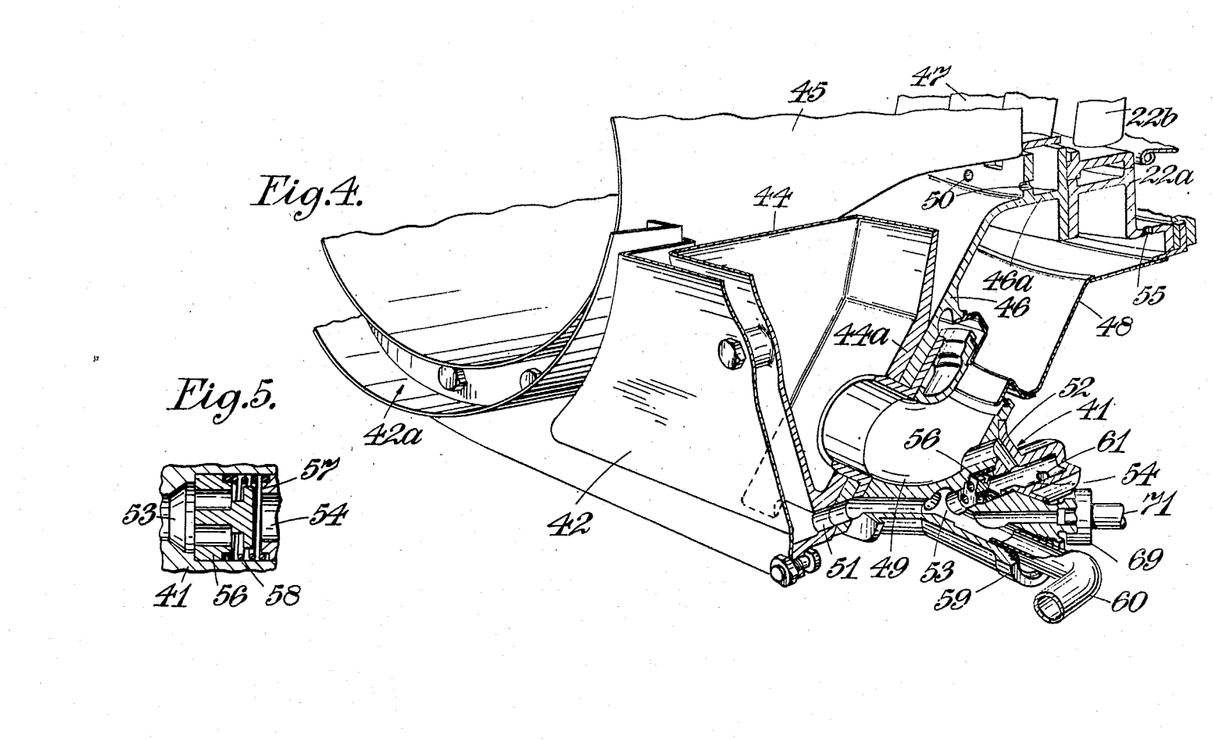
Figure 4 is a view showing further details of part of the arrangement of Figure 2.
Figure 5 is an enlarged view of part of Figure 4.

There is also associated with the engine a second drainage fuel collector tank 40 connected to a drain valve 41 for receiving drainage fuel from the combustion equipment 21 and the turbine assembly 22. The drain valve 41 is mounted on the engine below the nozzle box structure (see Figure 4) through which the working fluid passes from the flame tubes 29 of the combustion chambers 21 to the turbine 22 of the engine.

Where the combustion equipment 21 comprises, as illustrated, a plurality of separate combustion chambers, the nozzle box structure may comprise three main parts as shown in Figures 1 and 4. The first and upstream part 42 is in the form of a large-diameter ring having apertures 42a formed in it to receive the outlet ends of the combustion chamber air casings 28. The second part is in the form of a ring 43 whose internal diameter is similar to the internal diameter of the upstream part 42 and which is formed with a series of hollow box-section radial arms 44 to extend one between each pair of air casings 28. Within the nozzle box structure are housed the nozzles 45 through which the gases pass from the combustion chambers to the turbine. The third or downstream part 46 is a ring of substantially frusto-conical form at its upstream end to fit over and engage with pads 44a on the extremities of the radial arms 44 and to be secured at its upstream end, which is its end of larger diameter, to the outer periphery of the upstream ring 42. The downstream portion 46a of the third part 46 is substantially cylindrical and receives the nozzle guide vane assembly 47 within it. Surrounding the cylindrical portion 46a is a cylindrical casing 48 defining a cooling air manifold, and cooling air which has been passed over the bearings is delivered from the interior of each of the hollow radial arms 44 by means of a corresponding large-diameter elbow-shaped duct 49 into the cooling air manifold casing 48.

Drillings 50 are provided in the nozzle box structure so that fuel tending to accumulate in the nozzle guide vane assembly 47 can drain to the lowermost part of the space between the upstream and downstream nozzle box parts 42, 46 and thus through drain passage 51 into a first valve chamber 53 of the drain valve 41, or can drain through drillings 55 into the cooling air manifold casing 48 and to the lowermost part thereof and thus into the lowermost elbow-shaped duct 49 and from there through a narrower duct 52 into a second valve chamber 54 in the drain valve 41. Any fuel collecting in the upstream end of the exhaust assembly 24 adjacent the joint with the turbine outer structure 22a is allowed to drain through drillings 55 into the cooling air manifold casing 48 and thus into the drain valve 41.

The drain valve 41 comprises a piston valve 56 (Figures 4 and 5) which is held onto its seating 57 by combustion chamber pressure and which is loaded to open by a light spring 58. The valve chamber 53 on the upstream side of the piston valve is that receiving drain fuel from the lowermost part of the space between the upstream and downstream nozzle box parts 42, 46 and this chamber is also connected through unions 59 and conduits 60 to the lowermost combustion chambers 21 (see Figures 2, 3) to receive drainage fuel from the combustion equipment. This chamber 53 is therefore at substantially the combustion chamber pressure during operation.

Where a ring of combustion chambers are provided (Figure 3) the upper combustion chambers 21a are connected by pipes 63 to drain into the combustion chambers 21b below them, and the chambers 21b drain through pipes 64 into the lowermost combustion chambers 21c which are connected directly through conduits 60 with the drain valve 41.

The second valve chamber 54, that is the valve chamber on the downstream side of the piston valve 56, is not only connected through duct 52 to the lowermost elbow-shaped duct 49 but is also connected through a union 61 and conduit 62 to the second drain fuel collector tank 40.

The drain valve 41 is normally closed during running of the engine and is arranged to open under the influence of spring 58 when the compressor delivery pressure falls to a preselected value, e. g. when the engine stops, to allow the fuel which may accumulate in the upstream valve chamber 53 when the engine is stopped to flow into the delivery conduit 62 leading to the second drainage fuel collector tank 40. It will be appreciated that fuel does not normally accumulate in chamber 53 when the engine is running, as no fuel will drain from the combustion chambers in this condition.

The second drainage fuel collector tank 40 is situated below the engine somewhat forward of the drain valve 41, and is of substantially rectangular form, with the addition of a domed portion 40a rising from the centre of its top surface. The conduit 62 from the chamber 54 on the downstream side of the drain valve 41 is led through the rear wall of the tank 40 and continues forward parallel to the base of the tank to stop short of the front wall 40b. The design is so arranged that the contents of the tank 40 will not be discharged to the drain valve 41, and thus to the cooling air manifold 48 around the turbine structure.

A connection may also be made to the second collector tank 40, whereby it receives fuel leaking through the joint between the exhaust cone outer wall 24 and the jet pipe 26. This joint may be enclosed by a sheet metal manifold, to which is attached at the lowest point a collector trough 65 (Figure 8). The manifold may be formed with a flanged hole, the flange extending into the container 65 so that fuel may pass from the manifold into the container 65 but is restrained from passing in the opposite direction, as in the well-known form of inkwell. The container 65 is connected by a pipe 66 to the collector tank 40, the pipe 66 passing through the rear wall of the tank and rising to open below the dome 40a. In this manner emptying of the contents of the tank 40 into the trough 65 is avoided. Collector troughs, such as troughs 76 may also be provided in a similar manner at the lowest point of manifolds enclosing the joints between the sections of the jet pipe 26, and the troughs may drain into trough 65 as through pipe 77.

The second drainage fuel collector tank 40 is also provided with a vent pipe 68 leading from the upper rear part of the tank 40 first forwards and then through the bottom of the tank 40, and the tank is provided with an outlet connection in the form of a pipe 67 from the lower rear portion of the tank 40 to the venturi pump unit 70.

One of the unions 59, to which the pipes 60 leads, has a side connection leading to a union 69 (see Figure 2) and pipe 71 whereby pressure air may be supplied from the combustion chambers to the pump unit 70 to operate it.

The pump unit 70 (Figures 6 and 7) is formed in two parts 78, 79. The part 78 is in the form of a block having formed therein a pair of parallel venturi passages 80 the inlets of which open into a common air chamber 81 at one end of the block, there being a lateral air inlet port to the chamber in the form of a union 82 to receive the delivery end of pipe 71. The block has formed on it a pair of lugs 83 by which the block can be bolted to a face-plate 84 stitch-welded to a sole-plate 85 mounted on the underside of the outer wall 24 of the exhaust assembly adjacent its upstream end, and the lugs 83 are so disposed on the block 78 that a nozzle-like portion 78a of the block having in it the outlet ends of the venturi passages 80 projects into an aperture 86 in the outer wall 24 of the exhaust assembly leading into the working fluid passage through it. It is arranged that the center lines of the venturi passages 80 make an angle of about 45° to the axis of the exhaust assembly so that fluid flowing through these passages enters the working fluid passage with a substantial component of velocity in a downstream direction.

Figures 3, 6, 7:
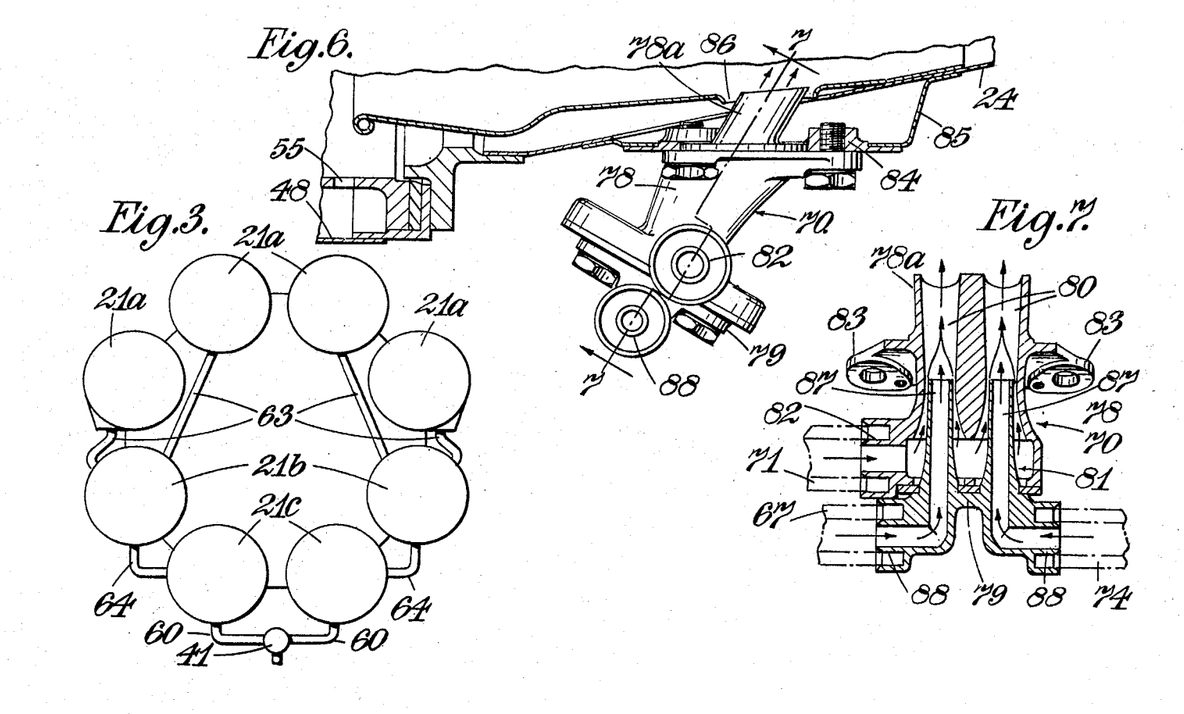
Figure 3 is a diagrammatic view illustrating one way in which drainage fuel is collected from combustion equipment.
Figure 6 illustrates in detail another part of the arrangement of Figure 2.
Figure 7 is a section on the line 7—7 of Figure 6.

The part 79 of the pump unit is in the form of a closure plate for the air supply chamber 81 to the venturi passages 80 and the closure plate has formed in one piece with it a pair of parallel nozzle elements 87 which, when the closure plate 79 is in position on the block 78, are coaxial with the venturi passages 80 and extend through the inlet ends of the venturi passages to have their outlets facing downstream adjacent the throats of the venturi passages 80. The closure plate 79 is also formed with a pair of unions 88 which communicate respectively with the nozzles 87. One of these unions 88 has connected with it the pipe 74 leading rearwardly from the first drain tank 38 and the second union 88 has connected to it the pipe 67 leading from the second drain tank 40.

In operation, fuel will normally drain into the collector tanks 38, 40 on shut down of the engine, and thus, when air is supplied to the venturi pump unit 70 on restarting the engine, any drainage fuel in the drain fuel collector tanks 38, 40 is sucked rearwardly by an ejector action and delivered through the nozzles 87 of the pump unit into the exhaust gases flowing in the exhaust assembly.

In an alternative arrangement the fuel nozzles may be in the form of an annular ring adjacent the throat of the venturi.

In this arrangement the venturi may consist of three main parts, each of which is substantially a body of revolution, of which the first part contains the outlet end of the venturi passage and has secured to it in any convenient manner lugs which lie in a plane at say 45° to the axis of the venturi passage and by which the venturi is secured to say the wall of an exhaust duct of the engine. The end of the first part at the outlet of the venturi passage is preferably cut off in a plane parallel to the lugs. The upstream end of the venturi passage in the first part opens into a cylindrical gallery, there being a short transition section between the two having a surface of a frustum of a cone. A radial drilling outward from the gallery connects with a fuel inlet union.

The bore of the first part upstream of the gallery (i. e. on the side thereof remote from the outlet) is of a diameter smaller than that of the gallery but larger than the larger-diameter end of the transition section; upstream of this bore is a second bore of larger diameter to provide a step, and the upstream end of the second bore is internally screw-threaded.

Received within the first part is a second part which has a stepped external diameter, whereof the larger diameter fits in the second bore and the smaller diameter fits in the smaller bore of the first part; the second part also extends within the gallery and may have a third yet smaller diameter in this region. A spacer ring within the second bore of the first part and surrounding the smaller diameter of the second part determines the relative axial position of the parts, and there is provided a third part which is externally threaded and has a central bore, the thread engaging the internal thread of the first part and the end of the third part abutting the end of the second part to secure it in position.

The second part is formed internally with the inlet and throat of the venturi and is externally frusto-conical at its downstream end which is spaced from the frusto-conical surface of the first part to provide a narrow annular slot communicating between the gallery and the divergent bore of the venturi downstream of the throat. The upstream end of the third part is formed with a union to which the pressure air supply is connected.

In operation the flow of air from the supply through the venturi causes a depression adjacent the slot and thus causes fuel to be drawn from the fuel inlet through the gallery into the venturi passage, whence it is injected in a downstream direction into the engine working fluid. The venturi tubes may of course be arranged in pairs, the galleries or a common gallery being connected say to pipes 67, 74 and the air inlet or inlets to pipe 71.

In a modification of the above arrangements, the venturi may be positioned to discharge into the jet stream immediately downstream of the propelling nozzle of the engine. For example the venturi may be mounted on the propelling nozzle structure.

In order to prevent pressurising of the drainage fuel collector tanks 38, 40 by the air supplied to the venturi pump unit 70, non-return valves may be provided in the pipe lines 67, 74 from the tanks to the venturi pump unit. However, it can be arranged by suitably designing the fuel nozzles 87 and the throat of the venturi passages 80, and by choice of the venturi air feed pressure, that the nozzles 87 are subjected at their outlets to a very low pressure. For instance, a considerable suction can be obtained when the venturi is choked by the air feed, i. e. when the velocity in the venturi throat is sonic.

It may also be arranged that the pressure at the venturi throats is below the pressure in the tanks 38, 40 when the venturis are not choked, so that the necessity for non-return valves in the pipe lines 67, 74 may be avoided under all conditions.

The design of the venturi and fuel nozzle of such an arrangement is in accordance with well-known aerodynamic principles, and involves designing the venturi so as to have a throat at which the velocity becomes sonic without shock, downstream of which the cross-section area increases to give a supersonic expansion in which the velocity increases. Downstream of this section again is a section of constant or slightly decreasing cross-section area which is arranged so that a shock wave occurs at its downstream end, the flow becoming subsonic across the shockwave. The final section downstream of the shockwave is of the form of a subsonic diffuser of increasing cross-section area. The fuel nozzle is arranged to open in the region of high supersonic velocity, say at the downstream end of the supersonic expansion section, and preferably faces downstream of the direction of flow. Such a design is preferably used in the arrangements described above.

Figure 9:
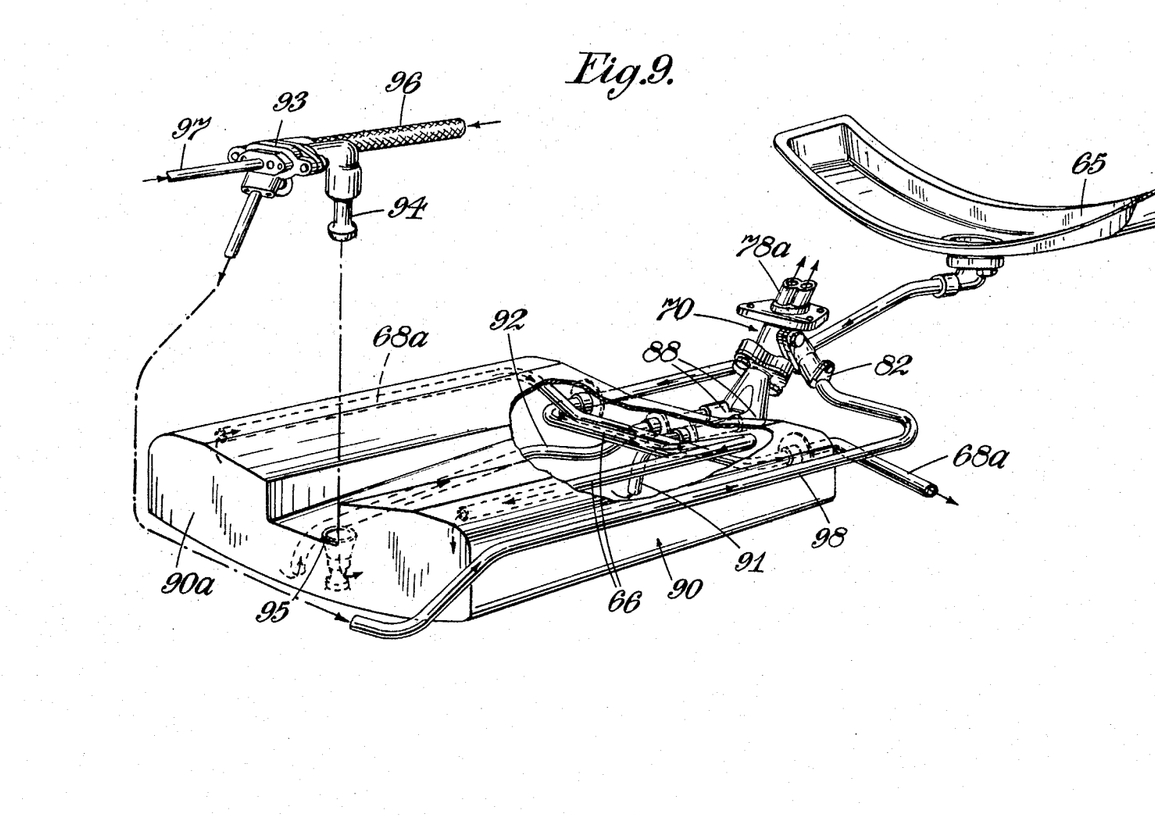
Figure 9 is a view corresponding to Figure 2 of an alternative embodiment of drainage fuel disposal means, of the power plant of Figure 1.

Referring now to Figure 9, there is shown another arrangement employing a venturi pump unit 70 similar to that shown in Figures 6 and 7.

In this arrangement there is only a single fuel collector tank 90 and it has two suction pipes 91, 92 leading therefrom to the unions 88 of the pump unit, the one pipe 91 having its inlet close to the bottom of the tank near its rear wall and the other pipe 92 having its inlet close to the bottom of the tank near the front wall 90a.

Drainage fuel from the fuel system elements 31—35 may be led directly to tank 90, as also is the drainage fuel from collector trough 65, in which is collected any fuel leaking through the joint between the exhaust cone 24 and the jet pipe 26 or through joints between sections of the jet pipe. The collector trough 65 is connected to tank 90 by pipe 66. The pipes are bent and arranged so that siphoning of the fuel from tank 90 does not occur.

Other drainage fuel enters the tank 90 from a unit 93 which incorporates a pair of valves 156 similar to the valve 56 of the drain valve 41. The tank 90 also has an overboard vent pipe 68a which leads from an upper forward corner of the tank to pass through the wall adjacent the opposite corner.

The unit 93 (see Figure 10) has a first chamber 153 which is connected to an air casing 28 of the combustion equipment 21 of the engine to receive air therefrom, by pipe 97, a second chamber 154 which has an outlet connection 94 which engages in an inlet 95 in the tank 90, and a third chamber 154a which is connected through flexible pipe 96 with the lowest point of the cooling air manifold 48 of the engine. The first chamber 153 is also connected through pipe 98 with the inlet union 82 of the venturi unit.

Figure 10:
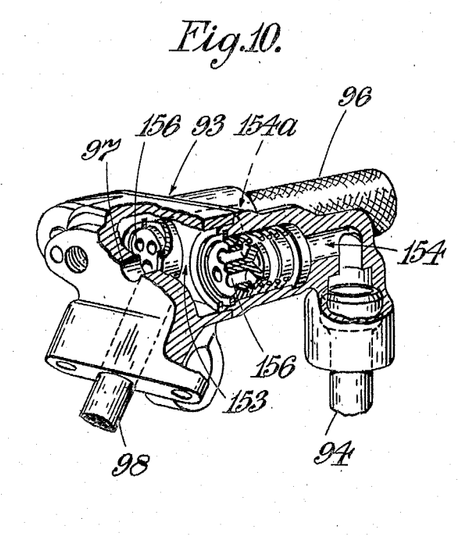
Figure 10 is a detail view of part of Figure 9.

During normal operation of the engine the valves 156 are closed by the air pressure in chamber 153, which is substantially the delivery pressure of the compressor, and thus air from the air casing 28 flows through chamber 153 and pipe 98 to the venturi, entraining fuel drawn from tank 90 through pipe 91 or 92 or both and ejecting it into the gas stream in the exhaust assembly.

When the compressor delivery pressure falls below a preselected value, e. g. when the engine is shut down, the valves are opened by the springs and fuel from pipes 96, 97 may flow through pipe 94 into the tank 90, whence it is drawn out by the ejector pump when the engine is started again. Any fuel flowing into pipe 98 is of course blown out when the engine is started.

Referring now to Figure 11, there is again provided a venturi pump unit 70, the pump unit being arranged as in the above-described embodiments to deliver entrained fuel into the exhaust assembly of a gas turbine engine, or into the exhaust gas just downstream of the final nozzle.

Figure 11:
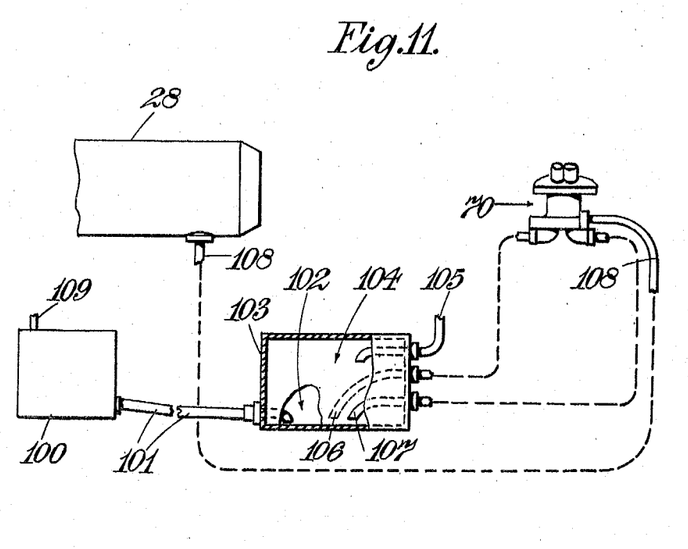
Figure 11 is a diagrammatic view illustrating yet another arrangement of drainage fuel disposal means.

In this arrangement, however, there is a small collector tank 100 adjacent the delivery end of the compressor 20 receiving through pipe 109 drain fuel from such parts of the fuel system as the throttle valve 31, the fuel pump 33 and the fuel manifold dump valve 39, and this tank is connected by a flexible hose 101 to one compartment 102 of a second and closed tank 103 which is arranged below the engine adjacent the nozzle box structure 42—46.

A second compartment 104 of the tank 103 is separated by a wall from compartment 102 and is connected by pipe 105 to receive drain fuel from the combustion equipment 21 and turbine 22, and the compartments 102, 104 have projecting into them suction pipes 106, 107 respectively, the one suction pipe 106 leading to one of the venturi pump nozzle unions 88 and the second suction pipe 107 leading to the second union 88; the compartments are vented to atmosphere through suitably arranged vent pipes similar to pipe 68. To prevent wastage of air, a valve such as valve 56 may be incorporated in pipe 105.

The air inlet union 82 of the venturi pump unit 70 is connected by flexible hosing 108 to the outlet end of the air casing 28 of the combustion equipment 21.

In a modification of the last-described arrangement, the drain pipes such as 105, 109 may each be connected at points along the length of pipe 101 interconnecting a pair of tanks axially-spaced below the engine, such as tanks 100, 103, the tanks each having only one compartment, and one of the suction pipes 106 may be led to the forward tank 100 and the other 107 to the rear tank 103. In this way the drainage fuel would be ejected through suction pipe 106 if the aircraft were in a nose-down attitude and through pipe 107 if the aircraft were in a tail-down attitude.

I claim:

1. In an open-cycle gas-turbine engine power-plant installation which includes a turbine, a working fluid duct downstream of said turbine through which a stream of exhaust gas from said turbine is delivered to atmosphere, and an element from which fuel is liable to drain under certain conditions of operation, a fuel drain arrangement comprising fuel collector tank means connected to said element to receive fuel draining therefrom, a source of pressure air in said installation, and ejector pump means including a venturi passage having an inlet connected to said source and having an outlet in communication with said exhaust gas stream whereby a depression is induced in a region of said venturi passage between said inlet and said outlet by the flow of pressure air, and a suction pipe connection from the collector tank to open into said region of the venturi passage, whereby fuel in the collector tank means is entrained in the air flowing through the venturi passage and is delivered into the stream of exhaust gas thereby to carry the fuel clear of the installation.

2. A fuel drain arrangement as claimed in claim 1, wherein the gas turbine engine of said power plant includes a compressor, and the source of pressure air is the compressor.

3. A fuel drain arrangement as claimed in claim 2, wherein the gas turbine engine of said power plant includes combustion equipment having an air casing, to which air is delivered by the compressor, and wherein the source of pressure air is said air casing of the engine combustion equipment.

4. In an open-cycle gas-turbine engine power-plant installation which includes a compressor, combustion equipment to which air is delivered from said compressor for combustion with fuel therein, a turbine connected to said combustion equipment to receive the products of combustion therefrom, and a working fluid duct downstream of said turbine through which a stream of exhaust gas from said turbine is delivered to atmosphere, the combustion equipment including an element from which fuel is liable to drain under certain conditions of operation, a fuel drain arrangement comprising a fuel collector tank, a connection from said tank to said element of the combustion equipment, valve means in said connection adapted to be loaded by the pressure in said combustion equipment to close said connection and resiliently loaded to open said connection when said pressure falls to a preselected value whereby said fuel collector tank receives fuel draining from said element of the combustion equipment, a source of pressure air in said installation, and ejector pump means including a venturi passage having an inlet connected to said source and having an outlet in communication with said exhaust gas stream whereby a depression is induced in a region of said venturi passage between said inlet and said outlet by the flow of pressure air, and a suction pipe connection from said collector tank to open into said region of the venturi passage, whereby fuel in the collector tank is entrained in the air flowing through the venturi passage and is delivered into the stream of exhaust gas thereby to carry the fuel clear of the installation.

5. A fuel drain arrangement as claimed in claim 4, wherein said source of pressure air comprises a branch pipe from said connection between the element of the combustion equipment and said valve means.

6. A fuel drain arrangement as claimed in claim 1, wherein the ejector pump is connected to an exhaust assembly of an engine of the power plant installation, to deliver drain fuel into the exhaust gas stream therein.

7. A fuel drain arrangement as claimed in claim 1, wherein the ejector pump is arranged to deliver the fuel into an exhaust jet stream which has passed through the final nozzle of the jet pipe of a gas-turbine engine.

8. A fuel drain arrangement as claimed in claim 7, wherein the ejector pump arrangement comprises a plurality of venturi passages each with an associated suction pipe for draining the fuel.

9. A fuel drain arrangement as claimed in claim 8, wherein the collector tank means comprises separate drain fuel tanks at different locations in the power plant installation and the suction pipes each lead to a different drain fuel tank.

10. A fuel drain arrangement as claimed in claim 8, wherein fuel suction pipes associated with a pair of venturi passages are arranged to draw fuel from opposite ends of the same drain fuel tank.

11. A fuel drain arrangement as claimed in claim 10, wherein a common air supply is made to the venturi passages.

12. A fuel drain arrangement as claimed in claim 11, wherein the venturi passages are formed as a unit in a single body and open at their inlet ends to a common air supply chamber in the body.

13. A fuel drain arrangement as claimed in claim 6, wherein the ejector pump arrangement comprises a plurality of venturi passages each with an associated suction pipe for drainnig the fuel.

14. A fuel drain arrangement as claimed in claim 13, wherein the collector tank means comprises separate drain fuel tanks at different locations in the power plant installation and the suction pipes each lead to a different drain fuel tank.

15. A fuel drain arrangement as claimed in claim 13, wherein fuel suction pipes associated with a pair of venturi passages are arranged to draw fuel from opposite ends of the same drain fuel tank.

16. A fuel drain arrangement as claimed in claim 15, wherein a common air supply is made to the venturi passages.

17. A fuel drain arrangement as claimed in claim 16, wherein the venturi passages are formed as a unit in a single body and open at their inlet ends to a common air supply chamber in the body.

References Cited in the file of this patent
UNITED STATES PATENTS

| | | |
|---|---|---|
| 2,446,013 | Kuyper | July 27, 1948 |
| 2,551,241 | Buckland | May 1, 1951 |
| 2,578,501 | Boosinger | Dec. 11, 1951 |
| 2,622,393 | Edwards et al. | Dec. 23, 1952 |
| 2,664,701 | Allen et al. | Jan. 5, 1954 |
| 2,676,458 | Hill | Apr. 27, 1954 |